United States Patent
Kato (10) Patent No.: US 8,478,495 B2
(45) Date of Patent: Jul. 2, 2013

(54) SHIFT CONTROL DEVICE FOR CONTINUOUSLY VARIABLE TRANSMISSION

(75) Inventor: Tetsuya Kato, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 196 days.

(21) Appl. No.: 13/064,088

(22) Filed: Mar. 4, 2011

(65) Prior Publication Data

US 2011/0238272 A1 Sep. 29, 2011

(30) Foreign Application Priority Data

Mar. 25, 2010 (JP) .................................. 2010-069793

(51) Int. Cl.
*G06F 19/00* (2006.01)

(52) U.S. Cl.
USPC .................................. 701/55; 701/51; 701/54

(58) Field of Classification Search
None
See application file for complete search history.

(56) References Cited

U.S. PATENT DOCUMENTS

2003/0105574 A1* 6/2003 Ino et al. .......................... 701/93
2008/0119319 A1* 5/2008 Kaya et al. ........................ 477/3

FOREIGN PATENT DOCUMENTS

JP 2008-120268 5/2008

* cited by examiner

*Primary Examiner* — Thomas Tarcza
*Assistant Examiner* — Garrett Evans
(74) *Attorney, Agent, or Firm* — McGinn Intellectual Property Law Group, PLLC (57) ABSTRACT

A requested cruise-control horsepower calculator obtains a requested cruise-control horsepower from a speed difference between a target cruising vehicle speed and an actual vehicle speed. A requested cruise-control torque calculator obtains a requested cruise-control torque on the basis of the requested cruise-control horsepower and an engine rotation speed. A cruise-control accelerator-opening calculator sets a cruise-control accelerator opening by referring to an engine torque map in which a cruise-control accelerator-opening characteristic curve is set along an equal horsepower line on the basis of the requested cruise-control torque and the engine rotation speed. A target primary rotation-speed calculator sets a target primary rotation speed by referring to a shift-line map on the basis of the cruise-control accelerator opening and the actual vehicle speed. A shift controller obtains a target gear shift ratio on the basis of the target primary rotation speed and the actual vehicle speed so as to perform shift control.

11 Claims, 4 Drawing Sheets

SHIFT CONTROL DEVICE FOR CONTINUOUSLY VARIABLE TRANSMISSION

CROSS-REFERENCES TO RELATED APPLICATIONS

The present application claims priority from Japanese Patent Application No. 2010-069793 filed on Mar. 25, 2010, the entire contents of which are hereby incorporated by reference.

BACKGROUND OF THE INVENTION

1. Field of the Invention

The present invention relates to a shift control device for a continuously variable transmission, in which a cruise-control accelerator-opening characteristic curve set on the basis of a requested torque and an engine rotation speed during cruise control is set along an equal horsepower line.

2. Description of the Related Art

There have been known vehicles equipped with cruise control devices. A cruise control device performs feedback control by detecting a difference (speed difference) between a vehicle speed set by a driver and an actual vehicle speed and controlling an engine output on the basis of the speed difference and a gear shift ratio of an automatic transmission so that the actual vehicle speed matches a target vehicle speed. For example, when a vehicle is running in a cruise control mode, if the vehicle reaches a road surface that requires a large running load, such as an uphill slope, the vehicle speed temporarily decreases. Therefore, the opening of a throttle valve is increased by performing engine control so that the engine output is increased. On the other hand, in shift control, since the opening of the throttle valve is greatly increased, the vehicle is accelerated by downshifting the automatic transmission so that the actual vehicle speed returns to the set vehicle speed.

As an example of shift control performed during a cruise control mode, Japanese Unexamined Patent Application Publication No. 2008-120268 discloses a technology of firstly obtaining a requested torque on the basis of the speed difference between the actual vehicle speed and the target vehicle speed, reverse-calculating an accelerator opening (cruise-control accelerator opening) on the basis of the requested torque and the engine rotation speed, obtaining a requested cruise-control accelerator opening from the cruise-control accelerator opening, and performing shift control on the basis of the requested cruise-control accelerator opening and the vehicle speed.

Furthermore, Japanese Unexamined Patent Application Publication No. 2008-120268 also discloses a technology for preventing gear hunting caused as a result of repetition of kick-down and downshifting. Specifically, gear hunting is prevented by limiting the cruise-control accelerator opening to an upper limit threshold value so that excessive shift operation is minimized when the cruise-control accelerator opening significantly fluctuates in response to a small change in the requested torque.

As an automatic transmission installed in a vehicle, there is known a continuously variable transmission (CVT) that can set the gear shift ratio in a continuous and stepless manner. Shift control in a typical CVT is performed by firstly setting a target primary rotation speed (i.e., a value proportional to the engine rotation speed) on the basis of the vehicle speed and the accelerator opening and then calculating a target gear shift ratio (secondary-rotation-speed/primary-rotation-speed) from the target primary rotation speed and an actual secondary rotation speed.

As mentioned above, because the gear shift ratio in the CVT is set in a continuous and stepless manner, there is substantially no hysteresis in response to a change in the accelerator opening. Therefore, gear hunting tends to occur excessively during cruise control, as compared with a multi-stage transmission.

Figure 4:
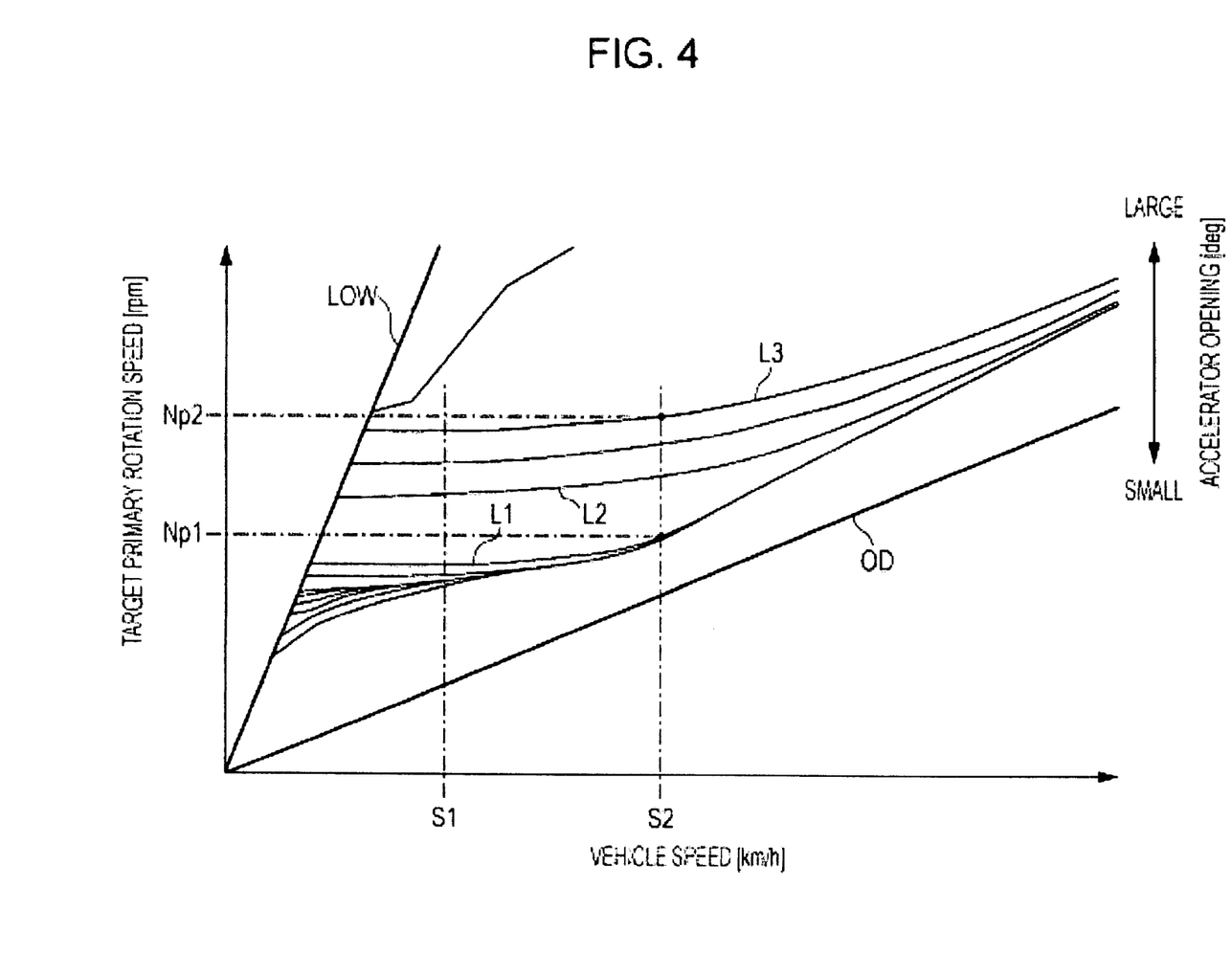
FIG. 4 is a schematic diagram of a shift-line map of a continuously variable transmission.

FIG. 4 illustrates a shift-line map used in a CVT. As shown in FIG. 4, in the shift-line map, the accelerator opening is set in a region surrounded by a low-speed shift line LOW corresponding to a maximum target gear shift ratio (target primary rotation speed) and a high-speed shift line OD corresponding to a minimum gear shift ratio. The target primary rotation speed (≈target engine rotation speed) is determined on the basis of the current vehicle speed and the accelerator opening.

Specifically, because the rotation of an output shaft of the engine is decreased in speed by the CVT so as to become the wheel speed (vehicle speed), if the target primary rotation speed engine rotation speed) is set relative to the vehicle speed on this shift-line map, the gear shift ratio of the CVT can be determined. Therefore, since the target primary rotation speed increases with increasing accelerator opening when the vehicle is running at a constant vehicle speed, the gear shift ratio becomes a large value.

As shown in FIG. 4, in a region lower than or equal to a curve L1 that indicates that the vehicle speed is equal to a mid speed S1 (for example, 40 km/h) and the accelerator opening at that time is a small opening (for example, 20%), the target primary rotation speed does not significantly change even in response to a change in the accelerator opening. However, when the accelerator opening is increased, the target primary rotation speed is set to change significantly in curves L2 and L3 indicating intermediate openings (for example, 35% and 50%, respectively). Therefore, even when the vehicle is running at a constant vehicle speed, the target primary rotation speed significantly changes when the accelerator opening is between a small opening and an intermediate or large opening. Correspondingly, the CVT downshifts or upshifts so that the gear shift ratio matches the target gear shift ratio.

If the target primary rotation speed is set on the basis of the aforementioned cruise-control accelerator opening and the vehicle speed by referring to the aforementioned shift-line map during cruise control, the shift operation in the CVT becomes excessive in a region in which the target primary rotation speed significantly changes in response to a slight change in the cruise-control accelerator opening, causing gear hunting to occur readily.

As a countermeasure against this problem, an excessive shift operation during a transitional period can be suppressed by limiting the cruise-control accelerator opening to an upper limit threshold value, as disclosed in Japanese Unexamined Patent Application Publication No. 2008-120268 mentioned above. However, this means that the shift operation is also limited for power-requiring running conditions, such as accelerating from a complete stop or running on an uphill slope. This is problematic in that the driver may feel a lack of output.

SUMMARY OF THE INVENTION

In view of the circumstances described above, an object of the present invention is to provide a shift control device for a continuously variable transmission in which, when cruise control is being performed in a vehicle equipped with a continuously variable transmission, the occurrence of gear hunting in the continuously variable transmission is prevented even when a cruise-control accelerator opening obtained by calculation temporarily undergoes a rapid change during a transitional period, thereby achieving good acceleration performance.

In order to achieve the aforementioned object, the present invention provides a shift control device for a continuously variable transmission. The shift control device includes requested horsepower calculating means that obtains a requested horsepower, for making an actual vehicle speed reach a target vehicle speed set during cruise control, on the basis of a speed difference between the target vehicle speed and the actual vehicle speed; requested torque calculating means that obtains a requested torque on the basis of the requested horsepower and an engine rotation speed; accelerator-opening calculating means that obtains a cruise-control accelerator opening on the basis of the requested torque and the engine rotation speed; and shift controlling means that performs shift control by setting a target gear shift ratio of the continuously variable transmission on the basis of the cruise-control accelerator opening obtained by the accelerator-opening calculating means and the actual vehicle speed. In the shift control device, the accelerator-opening calculating means has a map for designating the cruise-control accelerator opening on the basis of the requested torque and the engine rotation speed, and the map stores a cruise-control accelerator-opening characteristic curve set along an equal horsepower line.

According to the present invention, since the cruise-control accelerator-opening characteristic curve set during cruise control is set along the equal horsepower line, even when the requested torque increases during a transitional period and the cruise-control accelerator opening rapidly increases, the requested torque and the engine rotation speed move along the equal horsepower line as the continuously variable transmission subsequently performs a shift operation. Therefore, the cruise-control accelerator opening does not rapidly change thereafter, whereby gear hunting in the continuously variable transmission caused by a rapid change in the cruise-control accelerator opening during a transitional period can be suppressed. Furthermore, since the continuously variable transmission is downshifted due to the increase in the cruise-control accelerator opening, good acceleration performance can be achieved.

DESCRIPTION OF THE PREFERRED EMBODIMENTS

An embodiment of the present invention will be described below with reference to the drawings. Reference numeral 1 in FIG. 1 denotes an engine. An output side of this engine 1 is connected to an automatic transmission device 4 that includes a torque converter 2 and a continuously variable transmission (CVT) 3.

Figure 1:
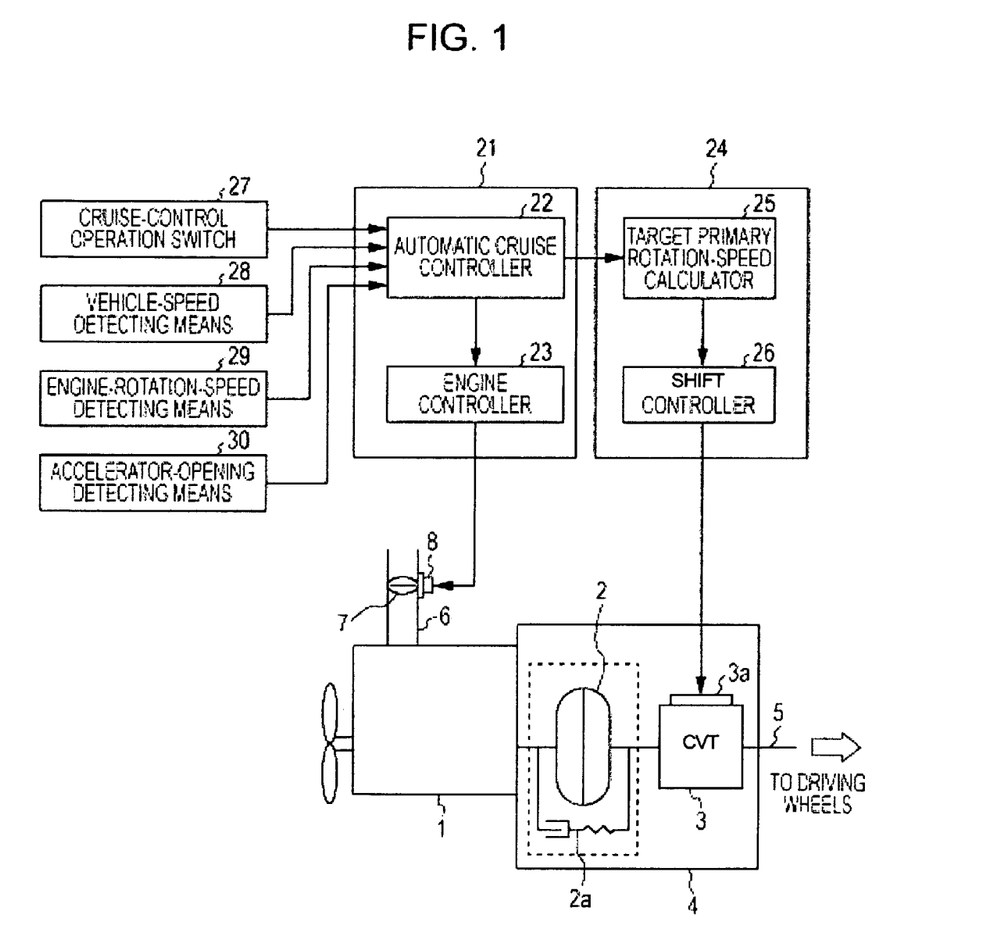
FIG. 1 is a schematic configuration diagram of a vehicle driving system.

An output power from the engine 1 is transmitted to the CVT 3 by a fluid in the torque converter 2 or via a lock-up clutch 2a provided in the torque converter 2 and is changed to a predetermined gear shift ratio in the CVT 3. The power is then transmitted toward driving wheels, such as rear wheels or front wheels, from an output shaft 5.

A throttle valve 7 is provided at an intermediate section of an intake path 6 that communicates with an intake port (not shown) of the engine 1. The throttle valve 7 is connected to a throttle motor 8, such as a stepping motor, and the throttle motor 8 is driven in response to a later-described driving signal from an engine controller 23, so that the degree of valve opening is controlled.

The CVT 3 is combined with a control valve unit 3a. The control valve unit 3a is configured to cause a transmission mechanism provided within the CVT 3 to perform a shift operation, and adjust the hydraulic pressure to be applied to a primary pulley and a secondary pulley of the CVT 3 in accordance with a shift control signal (hydraulic signal) from a later-described shift controller 26 so as to obtain a desired gear shift ratio. There are known various types for the transmission mechanism in the CVT 3, such as a belt type, a chain type and a toroidal type, and a belt-type or a chain-type transmission mechanism having a primary pulley and a secondary pulley will be described as an example in this embodiment.

Reference numeral 21 denotes an engine control unit (ECU) mainly constituted of a known microcomputer that includes a central processing unit (CPU), a read-only memory (ROM), and a random access memory (RAM). As functions for controlling the running condition during cruise control, the ECU 21 is equipped with an automatic cruise controller 22 as an example of cruise controlling means and an engine controller 23 as engine controlling means.

Reference numeral 24 denotes a transmission control unit (TCU) mainly constituted of a known microcomputer that includes a central processing unit (CPU), a read-only memory (ROM), and a random access memory (RAM). As functions for performing shift control when the vehicle is running, the TCU 24 is equipped with a target primary rotation-speed calculator 25 as target primary rotation-speed calculating means and a shift controller 26 as shift controlling means.

When a cruise-control operation switch 27 provided on an instrument panel is turned on, the automatic cruise controller 22 reads an actual vehicle speed S (km/h) detected by vehicle-speed detecting means 28, an engine rotation speed Ne (rpm) detected by engine-rotation-speed detecting means 29, and an accelerator opening θa (%) detected by accelerator-opening detecting means 30 so as to obtain a target throttle opening θαs (deg) and a cruise-control accelerator opening (%).

The vehicle-speed detecting means 28 may be a vehicle-speed sensor or wheel-speed sensors. Wheel-speed sensors are configured to detect the wheel speeds of the respective wheels. An average value of the wheel speeds detected by the respective wheel-speed sensors is regarded as the actual vehicle speed S. The engine-rotation-speed detecting means 29 is configured to detect the rotation speed of an engine output shaft (for example, a crankshaft). The accelerator-opening detecting means 30 is configured to detect how much an accelerator pedal is pressed, and is constituted of a known rotary encoder, resolver, or potentiometer. The accelerator-opening detecting means 30 is set such that 0% corresponds to when the accelerator pedal is released and 100% corresponds to when the accelerator pedal is fully pressed.

The engine controller 23 has an electronic-control throttle system that drives the throttle motor 8 so as to rotate the throttle valve 7, and performs feedback control so that the opening of the throttle valve 7 matches the target throttle opening θαs obtained by the automatic cruise controller 22.

The shift controller 26 performs feedback control by downshifting or upshifting so that the primary rotation speed of the CVT 3 matches a target primary rotation speed Npo obtained from the accelerator opening.

Figure 2:
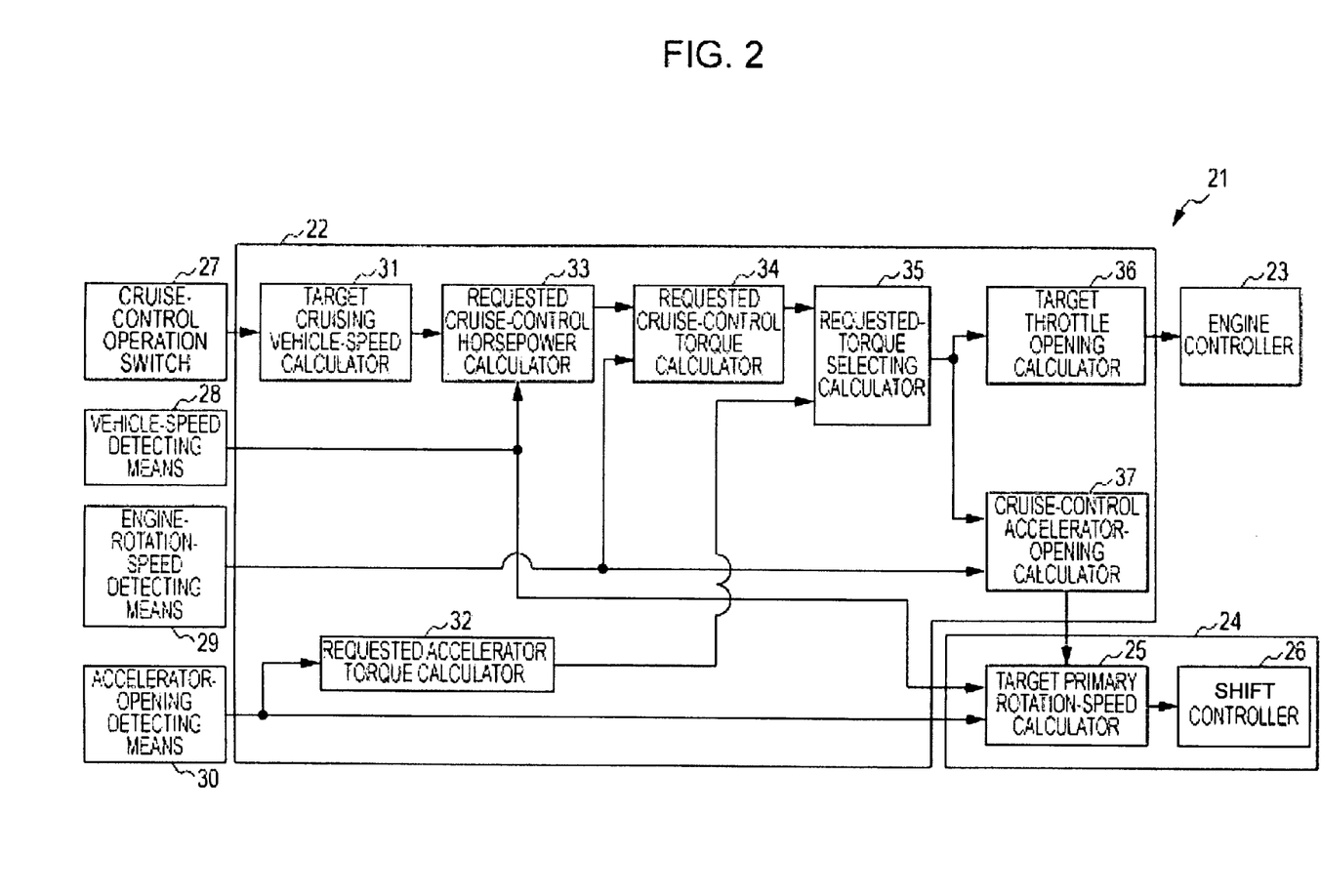
FIG. 2 is a functional block diagram illustrating the configuration of an automatic cruise controller.

Referring to FIG. 2, as functions for achieving cruise control, the automatic cruise controller 22 specifically includes a target cruising vehicle-speed calculator 31, a requested accelerator torque calculator 32, a requested cruise-control horsepower calculator 33 as requested horsepower calculating means, a requested cruise-control torque calculator 34, a requested-torque selecting calculator 35, a target throttle opening calculator 36, and a cruise-control accelerator-opening calculator 37 as accelerator-opening calculating means.

Next, processing performed in each of the calculators 31 to 37 included in the automatic cruise controller 22 will be described.

When a driver turns on the cruise-control operation switch 27 provided on the instrument panel (not shown) in the vehicle, the vehicle running mode switches to an automatic cruising mode. The target cruising vehicle-speed calculator 31 sets a vehicle speed (set vehicle speed) set by the driver as a target cruising vehicle speed So.

The target cruising vehicle speed So is read by the requested cruise-control horsepower calculator 33. Based on a speed difference $\Delta S$ (=So−S) between the target cruising vehicle speed So and the actual vehicle speed S detected by the vehicle-speed detecting means 28, the requested cruise-control horsepower calculator 33 obtains a requested cruise-control horsepower HPs for making the actual vehicle speed S reach the target cruising vehicle speed So by using a calculation equation or table lookup.

The requested cruise-control horsepower HPs is read by the requested cruise-control torque calculator 34. Based on the requested cruise-control horsepower HPs and the engine rotation speed Ne, the requested cruise-control torque calculator 34 obtains a requested cruise-control torque Tcs with the following equation:

$$Tcs = k(Hps/Ne)$$

Here, k is a coefficient. The requested cruise-control torque Tcs may be preliminarily stored in a map having the requested cruise-control horsepower HPs and the engine rotation speed Ne as parameters, and may be set by being retrieved from the map.

On the other hand, based on the accelerator opening $\theta a$ detected by the accelerator-opening detecting means 30 and the actual vehicle speed S, the requested accelerator torque calculator 32 refers to an engine torque map with interpolation calculation so as to set a requested accelerator torque Tacs. The engine torque map is commonly known and has a demand or the like with respect to driver's drivability set therein as a requirement, and has characteristics different from those of a cruise-control engine torque map, which will be described later.

The requested-torque selecting calculator 35 compares the requested cruise-control torque Tcs and the requested accelerator torque Tacs and sets the higher one of the two values as a torque (requested torque) Ts to be supplied to the engine 1. Therefore, when the accelerator pedal is released by the driver during the automatic cruising mode, the requested cruise-control torque Tcs is set as the requested torque Ts for the engine (Ts←Tcs).

The requested torque Ts is read by the target throttle opening calculator 36 and the cruise-control accelerator-opening calculator 37. Based on the requested torque Ts, the target throttle opening calculator 36 obtains the target throttle opening $\theta \alpha s$ that corresponds to the requested torque Ts and outputs the target throttle opening $\theta \alpha s$ to the engine controller 23. The engine controller 23 performs feedback control with respect to the degree of opening of the throttle valve 7 so that the actual throttle opening matches the target throttle opening $\theta \alpha s$.

On the other hand, based on the requested torque Ts and the engine rotation speed Ne, the cruise-control accelerator-opening calculator 37 refers to a cruise-control engine torque map with interpolation calculation so as to set a cruise-control accelerator opening $\theta ha$ by reverse reference.

Figure 3:
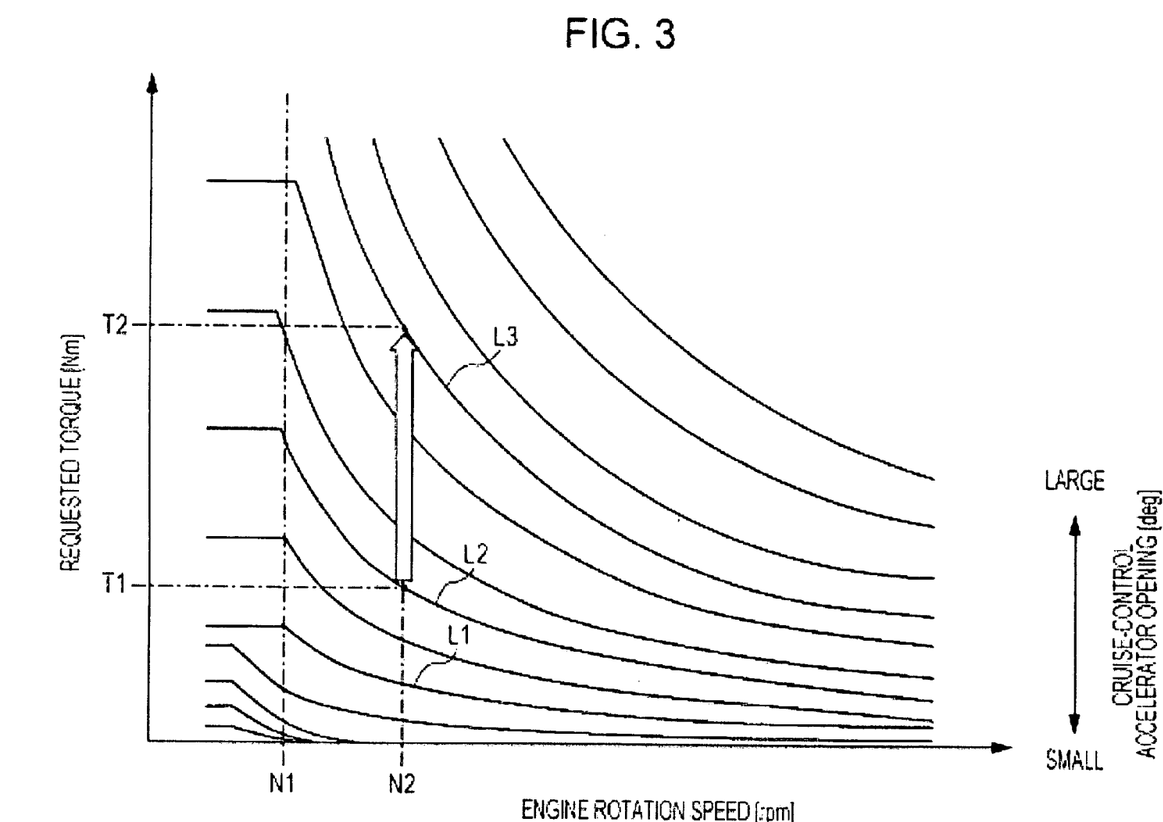
FIG. 3 is a schematic diagram of a cruise-control engine torque map.

FIG. 3 illustrates the cruise-control engine torque map. The cruise-control engine torque map is a three-dimensional map in which the abscissa denotes the engine rotation speed Ne (rpm) and the ordinate denotes the requested torque Ts (Nm). In the cruise-control engine torque map, the cruise-control accelerator opening $\theta ha$ is stored at each grid point designated by the engine rotation speed Ne and the requested torque Ts. Although a transmission loss of a driving system is actually incorporated in the cruise-control accelerator opening $\theta ha$, the cruise-control accelerator opening $\theta ha$ is basically set for each accelerator opening along an equal horsepower line.

An equal horsepower line is a characteristic curve obtained by connecting dots corresponding to equal horsepower (output) values, each obtained from a product of the engine rotation speed and the engine torque. Because the cruise-control accelerator opening $\theta ha$ is basically set for each accelerator opening along this equal horsepower line, an equal accelerator-opening curve expressed on the cruise-control engine torque map is basically inversely proportional to the engine rotation speed Ne and the requested torque Ts.

In this embodiment, in a cruise-control accelerator-opening curve set for each cruise-control accelerator opening $\theta ha$, the accelerator opening within a low rotation speed range N1 (for example, 1000 rpm or lower) is set to be greater than the accelerator opening actually required when the vehicle accelerates from a complete stop. Thus, the target primary rotation speed Npo set in the target primary rotation-speed calculator 25, to be described later, is higher, thereby achieving good acceleration performance. Furthermore, because the initially set target primary rotation speed Npo is high, the shift operation (upshift) in the CVT 3 is performed earlier, thereby achieving good acceleration performance from a complete stop.

Consequently, if the requested horsepower is substantially constant when the vehicle is running in a mid to high speed range on flat ground, the relationship between the engine rotation speed Ne and the requested torque Ts changes substantially along the equal horsepower line even as the shift operation in the CVT 3 progresses, whereby the cruise-control accelerator opening $\theta ha$ is set to be substantially constant and does not suddenly fluctuate regardless of a change in the engine rotation speed Ne.

When the vehicle is to accelerate in or near a mid rotation speed range N2 (for example, 2000 rpm), the cruise-control accelerator opening $\theta ha$ temporarily undergoes a rapid change (rapid increase) since the requested torque Ts increases first. Correspondingly, the CVT 3 starts a downshift and causes the engine rotation speed Ne to increase so that the vehicle is set in an acceleration running mode, thereby achieving good acceleration performance.

Although the requested torque Ts gradually decreases as the engine rotation speed Ne increases during the acceleration running mode, since the shift operation in the CVT 3 changes substantially along the equal horsepower line on the basis of the engine rotation speed Ne and the requested torque Ts, the cruise-control accelerator opening θha does not rapidly change, thereby preventing gear hunting during a transitional period.

Because each cruise-control accelerator-opening curve expressed on the cruise-control engine torque map is basically set along the equal horsepower line in this manner, even when the cruise-control accelerator opening θha rapidly increases during an accelerating operation, such as during resume control in which an uphill running mode or the automatic cruising mode is temporarily cancelled and then resumed again, the cruise-control accelerator opening θha does not rapidly change since the shift operation in the CVT 3 subsequently changes substantially along the equal horsepower line, thereby preventing gear hunting in the CVT 3 during a transitional period.

The cruise-control accelerator opening θha is read by the target primary rotation-speed calculator 25 in the TCU 24. The target primary rotation-speed calculator 25 compares the accelerator opening θa detected by the accelerator-opening detecting means 30 with the cruise-control accelerator opening θha and refers to a shift-line map shown in FIG. 4 on the basis of the higher one of the two values and the actual vehicle speed S so as to set the target primary rotation speed Npo.

The shift controller 26 obtains a target gear shift ratio on the basis of the target primary rotation speed Npo and the actual vehicle speed S and performs shift control by downshifting or upshifting at a predetermined timing so that the current gear shift ratio reaches the target gear shift ratio.

As described above, according to this embodiment, the cruise-control accelerator-opening curve for each cruise-control accelerator opening θha set on the cruise-control engine torque map shown in FIG. 3 is set substantially along the equal horsepower line. Therefore, even when the cruise-control accelerator opening θha rapidly changes first not only during a constant-speed running mode on flat ground but also during an acceleration running mode, and then the engine rotation speed Ne subsequently increases due to a downshift in the CVT 3, the requested torque Ts decreases accordingly. Consequently, excessive shift operation is suppressed without the cruise-control accelerator opening θha undergoing a rapid change, whereby gear hunting can be effectively prevented.

Furthermore, in the cruise-control engine torque map, since the cruise-control accelerator opening θha set in the low rotation speed range is set to be greater than the actually required accelerator opening, the initially set target primary rotation speed Npo is higher. Thus, not only can good acceleration performance from a complete stop be achieved, but a subsequent shift operation (upshift) is performed earlier, thereby achieving good acceleration performance.

Next, control modes of cruise control performed by the automatic cruise controller 22 will be described.

1. Constant-Speed Running Mode on Flat Ground

When the vehicle is running at constant speed on flat ground, the speed difference ΔS between the target cruising vehicle speed So and the actual vehicle speed S is small, and the requested cruise-control torque Tcs therefore does not significantly change. Moreover, since the requested horsepower is substantially constant in this state, the cruise-control accelerator opening θha also does not rapidly change. Thus, the CVT 3 does not significantly change the gear ratio.

2. Acceleration Running Mode from Constant-Speed Running Mode on Flat Ground

For example, when the vehicle running on a highway reaches an uphill slope from a flat surface, the actual vehicle speed S temporarily decreases. Since this causes the speed difference ΔS between the target cruising vehicle speed So and the actual vehicle speed S to increase, the requested cruise-control torque Tcs alone increases first. As the requested cruise-control torque Tcs increases, the cruise-control accelerator opening θha set by referring to the engine torque map by reverse reference on the basis of the requested cruise-control torque Tcs and the engine rotation speed Ne increases, thereby causing the target primary rotation speed Npo set by referring to the shift-line map shown in FIG. 4 on the basis of the cruise-control accelerator opening θha and the actual vehicle speed S to increase. As a result, the CVT 3 starts a shift operation (downshift).

When the CVT 3 performs a downshift, the engine rotation speed Ne increases, causing the requested cruise-control torque Tcs to relatively decrease. The cruise-control accelerator opening θha is set by referring to the cruise-control engine torque map on the basis of the engine rotation speed Ne and the requested cruise-control torque Tcs (=requested torque Tc).

If the cruise-control accelerator opening θha is increased from, for example, a cruise-control accelerator-opening curve L1 (for example, accelerator opening of 30%) to a cruise-control accelerator-opening curve L3 (for example, accelerator opening of 70%) in FIG. 3, the target primary rotation speed Npo is set by referring to the shift-line map shown in FIG. 4 on the basis of the cruise-control accelerator opening θha in the cruise-control accelerator-opening curve L3 and the actual vehicle speed S. In this case, assuming that the current vehicle speed is defined as S2 (for example, 80 km/h), the target primary rotation speed Npo is increased from Np1 (for example, 1800 rpm) to Np2 (for example, 2700 rpm), as shown in FIG. 4. Thus, the CVT 3 starts a shift operation (downshift).

As a result, the engine rotation speed Ne increases, causing the requested cruise-control torque Tcs to relatively decrease. Since the shift operation in the CVT 3 changes along the equal horsepower line, the cruise-control accelerator opening θha set by referring to the cruise-control engine torque map by reverse reference does not rapidly change, thereby effectively preventing gear hunting in the CVT 3 during a transitional period.

As the speed difference ΔS approaches zero due to an acceleration running mode, the requested cruise-control torque Tcs decreases. When the speed difference ΔS becomes zero, the requested cruise-control torque Tcs becomes substantially constant (for example, T1 in FIG. 3), and the CVT 3 switches to an upshift. At the same time, the cruise-control accelerator-opening curve for setting the cruise-control accelerator opening θha gradually moves in a closing direction (for example, from L3 to L1), thereby switching to a constant-speed running mode.

3. Resume from Deceleration Running Mode

For example, when the driver presses the brake pedal, the automatic cruising mode is temporarily cancelled, causing the vehicle to switch to a deceleration running mode in which the throttle is fully closed. When the brake pedal is released, the automatic cruising mode is resumed so that the actual vehicle speed S returns to the previously set target cruising vehicle speed So due to acceleration. In consequence, the vehicle switches to the constant-speed running mode.

While the vehicle is accelerating from a point immediately after resuming the automatic cruising mode, the requested cruise-control torque Tcs drastically increases since the actual vehicle speed S and the engine rotation speed Ne have decreased. The cruise-control accelerator opening θha is set by referring to the engine torque map shown in FIG. 3 by reverse reference on the basis of the increased requested cruise-control torque Tcs (=requested torque Ts) and the engine rotation speed Ne.

For example, if the engine rotation speed Ne immediately after resuming the automatic cruising mode has decreased to the mid rotation speed range N2 (for example, 2000 rpm), and the requested torque Ts (requested cruise-control torque Tcs) is increased from T1 (for example, 100 Nm) to T2 (for example, 280 Nm), the cruise-control accelerator opening θha simply switches from the cruise-control accelerator-opening curve L1 to the cruise-control accelerator-opening curve L3. Specifically, since each cruise-control accelerator-opening curve is set substantially along the equal horsepower line, the cruise-control accelerator opening θha does not significantly change in a range lower than or equal to the mid rotation speed range N2 (for example, 2000 rpm) even when the engine rotation speed Ne changes while the requested torque Ts is constant.

Consequently, even when there is a significant increase in the requested torque Ts, the cruise-control accelerator opening θha does not excessively increase, and the engine rotation speed Ne increases moderately. On the other hand, since this does not mean that the cruise-control accelerator opening θha does not increase at all, an initial driving force for switching to an uphill running mode can be ensured, whereby the feeling of slowness during the uphill running mode can be prevented.

4. Acceleration Running Mode from Uphill Constant-Speed Running Mode

If the inclination of an uphill slope increases during the uphill running mode, the actual vehicle speed S and the engine rotation speed Ne of the vehicle running at constant speed on the uphill slope both decrease. Therefore, control is performed in a similar manner to that described in the above item 2 (Acceleration Running Mode from Constant-Speed Running Mode on Flat Ground). In this case, however, since the running load is large, the requested cruise-control torque Tcs and the engine rotation speed Ne are in a higher range as compared with those in the running mode on flat ground.

What is claimed is:

1. A shift control device, implemented on a computer processor, for a continuously variable transmission, the shift control device comprising:
   requested power calculating means that obtains a requested power, for making an actual vehicle speed reach a target vehicle speed set during a cruise control, on a basis of a speed difference between the target vehicle speed and the actual vehicle speed;
   requested torque calculating means that obtains a requested torque on a basis of the requested power and an engine rotation speed;
   accelerator-opening calculating means that obtains a cruise-control accelerator opening on a basis of the requested torque and the engine rotation speed; and
   shift controlling means that performs shift control by setting a target gear shift ratio of the continuously variable transmission on a basis of the cruise-control accelerator opening obtained by the accelerator-opening calculating means and the actual vehicle speed,
   wherein the accelerator-opening calculating means comprises a map for designating the cruise-control accelerator opening on the basis of the requested torque and the engine rotation speed, and
   wherein the map stores a cruise-control accelerator-opening characteristic curve set basically along an equal power line.

2. The shift control device for a continuously variable transmission according to claim 1, wherein, in the cruise-control accelerator-opening characteristic curve stored in the map, the cruise-control accelerator opening for a low rotation speed range of the engine rotation speed is set to be greater than an accelerator opening required for accelerating a vehicle from a complete stop.

3. The shift control device for a continuously variable transmission according to claim 1, further comprising:
   target throttle opening calculating means that, based on the requested torque, outputs a target throttle opening to engine controlling means that drives a throttle motor.

4. The shift control device for a continuously variable transmission according to claim 3, wherein the engine controlling means drives the throttle motor independent of the accelerator-opening calculating means.

5. The shift control device for a continuously variable transmission according to claim 3, wherein the engine controlling means drives the throttle motor independent of the shift controlling means.

6. The shift control device for a continuously variable transmission according to claim 1, wherein the equal power line is obtained by connecting dots corresponding to equal power values, each of the equal power values being obtained from a product of the engine rotation speed and an engine torque.

7. A shift control device, implemented on a computer processor, for a continuously variable transmission, the shift control device comprising:
   a requested power calculator that obtains a requested power, for making an actual vehicle speed reach a target vehicle speed set during a cruise control, on a basis of a speed difference between the target vehicle speed and the actual vehicle speed;
   a requested torque calculator that obtains a requested torque on a basis of the requested power and an engine rotation speed;
   an accelerator-opening calculator that obtains a cruise-control accelerator opening on a basis of the requested torque and the engine rotation speed;
   a shift controller that performs shift control by setting a target gear shift ratio of the continuously variable transmission on a basis of the cruise-control accelerator opening obtained by the accelerator-opening calculator and the actual vehicle speed, wherein the accelerator-opening calculator comprises a map for designating the cruise-control accelerator opening on the basis of the requested torque and the engine rotation speed; and
   a storage device, in which the map stores a cruise-control accelerator-opening characteristic curve set along an equal power line.

8. The shift control device according to claim 7, further comprising:
   a target throttle opening calculator that, based on the requested torque, outputs a target throttle opening to an engine controller that drives a throttle motor.

9. The shift control device according to claim 8, wherein the engine controller drives the throttle motor independent of the accelerator-opening calculator.

10. The shift control device according to claim 8, wherein the engine controller drives the throttle motor independent of the shift controller.

11. The shift control device according to claim 7, wherein the equal power is obtained by connecting dots corresponding to equal power values, each of the equal power values being obtained from a product of the engine rotation speed and an engine torque.

* * * * *